(12) United States Patent
Holliday

(10) Patent No.: US 8,208,368 B2
(45) Date of Patent: Jun. 26, 2012

(54) METHOD AND APPARATUS TO ENABLE A HYBRID SYNCHRONOUS/ASYNCHRONOUS ROUTING PROTOCOL

(75) Inventor: Peter Holliday, Wynnum (AU)

(73) Assignee: Cisco Technology, Inc., San Jose, CA (US)

( * ) Notice: Subject to any disclaimer, the term of this patent is extended or adjusted under 35 U.S.C. 154(b) by 183 days.

(21) Appl. No.: 12/430,589

(22) Filed: Apr. 27, 2009

(65) Prior Publication Data

US 2010/0271934 A1 Oct. 28, 2010

(51) Int. Cl.
*G01R 31/08* (2006.01)
*H04L 12/54* (2006.01)
*H04W 4/00* (2009.01)

(52) U.S. Cl. ............ 370/216; 370/328; 370/428
(58) Field of Classification Search ............ 370/216, 370/220, 221, 242, 252, 253, 328, 329, 338, 370/351, 389, 392, 396, 428, 429
See application file for complete search history.

(56) References Cited

U.S. PATENT DOCUMENTS

| | | | | |
|---|---|---|---|---|
| 7,453,864 B2 * | 11/2008 | Kennedy et al. | ............. | 370/351 |
| 7,500,014 B1 * | 3/2009 | Jacobson et al. | ............. | 709/239 |
| 7,698,463 B2 * | 4/2010 | Ogier et al. | ............. | 709/242 |
| 2007/0263628 A1 * | 11/2007 | Axelsson et al. | ............. | 370/392 |

OTHER PUBLICATIONS

Leguay, et al.; "*DTN Routing in a Mobility Pattern Space*"; SIGCOMM'05 Workshops; Aug. 22-26, 2005; 8 pgs.

Burbank, et al.; "*Key Challenges of Military Tactical Networking and the Elusive Promise of MANET Technology*"; IEEE Communications Magazine; Nov. 2006; pp. 39-45.
Clausen, et al.; "*The Optimized Link-State Routing Protocol version 2 draft-clausen-manet-olsrv2-01*"; Aug. 2005; pp. 1-68.
Clausen, et al.; "*MANET Neighborhood Discovery Protocol (NHDP) draft-ietf-manet-nhdp-09*"; Sep. 27, 2009; pp. 1-61.
Clausen, et al.; "*draft-ietf-manet-packetbb*"; IETF 72—Dublin; Oct. 13-15, 2008; 22 Pgs.
Iana "*IANA Assigned Port Numbers*"; http://www.iana.org/assignments/port-numbers; Mar. 26, 2009; 173 Pgs.
Clausen, et al.; "*Optimized Link State Routing Protocol (OLSR)*"; Oct. 2002; 76 Pgs.
Masimum; "*MASIMUM stands for MANET Simulation and Implementation at the University of Murcia*"; Home page; http://masimum.dif.um.es/nsrt-howto/html/; Jan. 23, 2009; 1 pg.
Ros, et al.; "*Implementing a New Manet Unicast Routing Protocol in NS2*"; Dept. of Information and Communications Engineering University of Murcia; Dec. 2004; 2 Pgs.
Clausen, et al.; "*Jitter Considerations in Mobile Ad Hoc Networks (MANETs)*"; Feb. 2008; 13 Pgs.
Clausen, et al.; "*Representing Multi-Value Time in Mobile Ad Hoc Networks (MANETs)*"; Mar. 2009; 15 Pgs.

(Continued)

*Primary Examiner* — Hanh Nguyen
(74) *Attorney, Agent, or Firm* — Merchant & Gould P.C.

(57) ABSTRACT

A hybrid routing protocol may be provided. A disruption tolerant mechanism may be provided for analyzing a network, detecting a disruption between nodes of the network, and activating a disruption tolerance mechanism in response to the network disruption. The disruption tolerance mechanism may comprise designating a non-disrupted network node as a cache node and routing traffic addressed to the disrupted node to the cache node for storage. Once the disrupted network node recovers from the disruption, the cache node may deliver the stored traffic to the disrupted network node.

16 Claims, 4 Drawing Sheets

OTHER PUBLICATIONS

Cerf, V., et al.; "*Delay-Tolerant Network Architecture: The Evolving Interplanetary Internet*"; IPN Research Group; Aug. 2002; 54 pgs.

Yang, G., et al.; "*Ad-hoc Storage Overlay System (ASOS): A Delay-Tolerant Approach in MANETs*"; Mobile Adhoc and Sensor Systems (MASS), 2006, IEEE International Conference on IEEE; Oct. 1, 2006; XP031003844; 10 pgs.

Fall, K., et al.; "*DTN: An Architectural Retrospective*"; IEEE Journal on Selected Areas in Communications, vol. 26, No. 5, Jun. 2008; 9 pgs.

Scott, K., et al.; "*Bundle Protocol Specification*"; The MITRE Corporation/NASA Jet Propulsion Laboratory; Nov. 2007; 50 pgs.

\* cited by examiner

300

METHOD AND APPARATUS TO ENABLE A HYBRID SYNCHRONOUS/ASYNCHRONOUS ROUTING PROTOCOL

TECHNICAL FIELD

The present disclosure relates generally to data communication protocols, and more particularly to protocols applied to ad-hoc networks.

BACKGROUND

In some situations, mobile devices may communicate with each other over an ad-hoc network. For example, laptop computers may be deployed in a location away from a permanent network infrastructure, but may still use the ad-hoc network to communicate. The devices may move out of range of each other, and data meant to be exchanged between the devices may be dropped rather than delivered. Thus, the conventional strategy is to discard the data destined for an out of range device. This often causes problems because the conventional strategy does not provide any recovery of the unreceived data if the out of range device moves back into range. For example, a laptop carried out of range for a time before returning to be within range of other devices on the ad-hoc network will not receive data sent to it while it was out of range.

BRIEF DESCRIPTION OF THE DRAWINGS

The accompanying drawings, which are incorporated in and constitute a part of this disclosure, illustrate various embodiments of the present invention. In the drawings.

DESCRIPTION OF EXAMPLE EMBODIMENTS

Overview

Figure 1A:
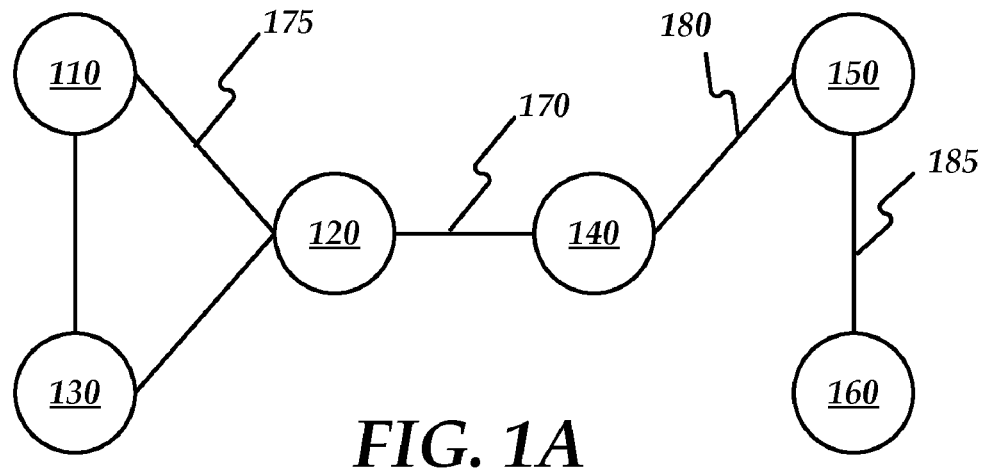
FIG. 1A-1B are block diagrams of a mobile ad-hoc network.

Consistent with embodiments of the present invention, systems and methods are disclosed for providing a hybrid routing protocol. A hybrid routing protocol may be provided. Methods may be provided for analyzing a network, detecting a disruption between nodes of the network, and activating a disruption tolerance mechanism in response to the network disruption. The disruption tolerance mechanism may comprise designating a non-disrupted network node as a cache node and routing traffic addressed to the disrupted node to the cache node for storage. Once the disrupted network node recovers from the disruption, the cache node may deliver the stored traffic to the disrupted network node.

Both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

DETAILED DESCRIPTION

A hybrid routing protocol may be provided. Consistent with embodiments of the present invention, network nodes may communicate via a mobile ad-hoc network (MANET). The MANET may comprise a network of mobile devices connected by a plurality of wireless links. Each device in a MANET may also act as a router by forwarding network traffic unrelated to its own use. Each MANET device may be free to move independently, in any arbitrary direction, and thus each device may potentially change its links to other devices on a regular basis. Such networks may operate in a standalone fashion, or may be connected to other networks, such as the Internet.

The hybrid routing protocol may enhance performance of a MANET by adding a disruption tolerance mechanism. For example, each device in a MANET may maintain a routing table comprising a list of network nodes and a list of connections between the network nodes. When one node moves out of range of other nodes in the network, a disruption may occur. In order to prevent network traffic addressed to the out-of-range node from being lost, the disruption tolerance mechanism may designate one of the network nodes as a cache node. Traffic addressed to the out-of-range node may be routed to the cache node for storage. Once the out-of-range node reconnects with the network, the stored traffic may be forwarded to the formerly out-of-range node.

FIG. 1A is a block diagram of a mobile ad-hoc network (MANET) 100. MANET 100 may comprise a plurality of network nodes such as first network node 110, second network node 120, third network node 130, fourth network node 140, fifth network node 150, and sixth network node 160. Each network node may connect to other nodes in the network. As illustrated, node 120 and node 140 are connected by a network connection 170, node 110 and node 120 are connected by a network connection 175, node 140 and node 150 are connected by a network connection 180, and node 150 and node 160 are connected by a network connection 185. Each device in MANET 100 may maintain a routing table listing the other nodes in MANET 100 and data associated with the connection links to reach the other nodes. For example, node 120 may create and/or maintain a routing table comprising the data shown in Table 1, below.

TABLE 1

Initial Node 120 Routing Table

| Destination | Next Hop | Distance | Imaginary |
| --- | --- | --- | --- |
| Node 110 | Node 110 | 1 | No |
| Node 130 | Node 130 | 1 | No |
| Node 140 | Node 140 | 1 | No |
| Node 150 | Node 140 | 2 | No |
| Node 160 | Node 140 | 3 | No |

Figure 1B:
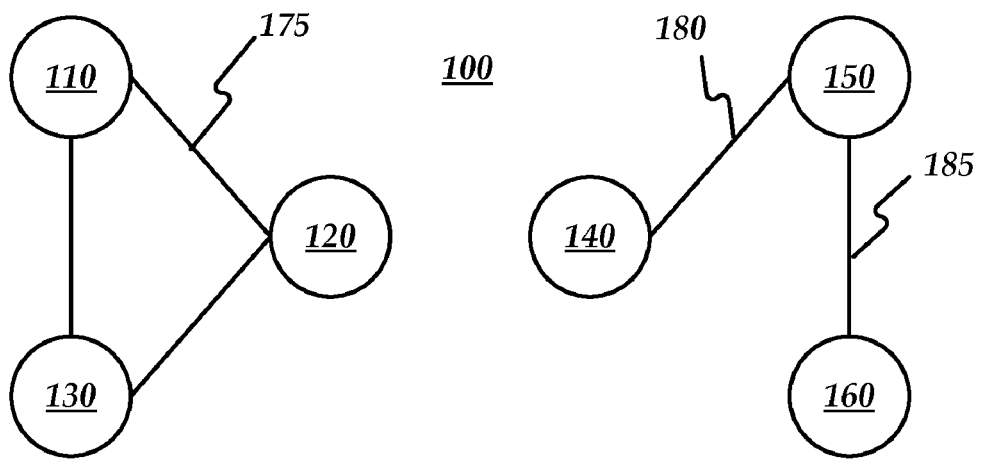

FIG. 1B is a block diagram of MANET 100 after a network disruption has occurred between node 120 and node 140. For example, node 140 may comprise a mobile device that has moved out of range of node 120. Because, in this example, node 120 may only route to node 150 and node 160, the network disruption also disrupts communication with those nodes. In response to the disruption MANET 100 may activate a disruption tolerance. For example, MANET 100 may designate node 120 as a cache node for the disrupted nodes and may route packets addressed to the disrupted nodes to node 120 for storage. The routing table of node 120 may thus be updated to comprise the data shown in Table 2, below.

TABLE 2

Post-Disruption Node 120 Routing Table

| Destination | Next Hop | Distance | Imaginary |
|---|---|---|---|
| Node 110 | Node 110 | 1 | No |
| Node 130 | Node 130 | 1 | No |
| Node 140 | Node 120 | 0 | Yes |
| Node 150 | Node 120 | 0 | Yes |
| Node 160 | Node 120 | 0 | Yes |

In mobile networking, as in MANET 100 or a cellular network, as nodes move there may be disruption on the network. The routing protocols used in a mobile environment may be a synchronous protocol that requires connectivity in order to exchange information. For example, a text message sent to an unconnected device may be lost unless an asynchronous store and forward capability is also provided. Instead, as a node moves out of range, the network may treat the node as unreachable so any new information sent to that node may simply be dropped. Consistent with embodiments of the invention, when a node in MANET 100 experiences a disruption from the network, the routing protocol may switch from synchronous to an asynchronous mode that does not require an active connection. Thus, information may be sent to the disrupted node so that when the disrupted node returns to the network, the information may be delivered.

The disruption mechanism may select a cache node in response to a disruption and may propagate alternative imaginary routes into the network. The disrupted portion of the network may appear active to the rest of the network while the cache node may manage the data forwarding should the disrupted portion of the network come back and reconnect at a later time. For example, in social networking, first responder, and military networks, disruptions may occur frequently as different node groups, such as squads and/or emergency vehicles, move and the network may break up and come back together. In response to detecting these disruptions, routes may be kept routes alive by inserting these imaginary routes into the routing tables. Once the network comes back, the real route may be propagated and the cache node that managed the forwarding and/or caching of data may forward those packets to the correct receiving node. Consistent with embodiments of the invention, a predictive forwarding mechanism may be applied. For example, in FIG. 1A where MANET 100 may be disrupted into two topologies, each topology may designate a cache node. The cache nodes may propagate imaginary routes for the disrupted nodes and begin to cache data for the disrupted nodes. Should one topology reconnect to another part of the network, such as by node 160 moving close enough to reconnect with node 130 before becoming disrupted once again, the original cache node, such as node 140, may relinquish its role and the node closest to the disrupted nodes more recently may be designated as the new cache node. Cached data may be forwarded from the relinquishing cache node to the new cache node, such as when the reconnection did not last long enough for all of the cached data to be delivered.

Figure 2:
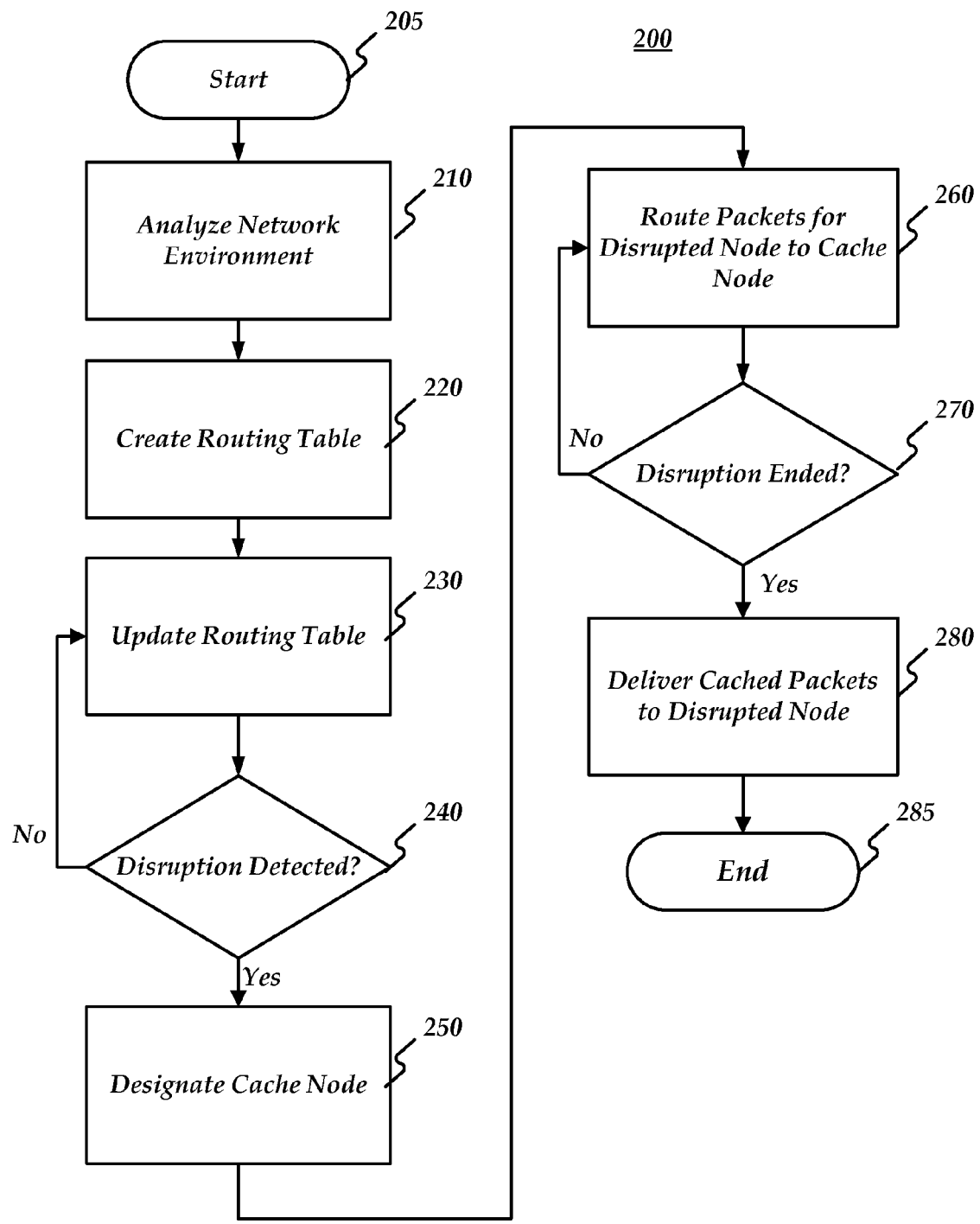
FIG. 2 is a flow chart of a method for providing a hybrid routing protocol.

FIG. 2 is a flow chart setting forth the general stages involved in a method 200 consistent with embodiments of the invention for providing a hybrid routing protocol. Method 200 may be implemented using a computing device 400 as described in more detail below with respect to FIG. 4. Ways to implement the stages of method 200 will be described in greater detail below. Method 200 may begin at starting block 205 and proceed to stage 210 where computing device 400 may analyze the network environment. Computing device 400 may comprise one of the network nodes of MANET 100, such as network node 120, and may use control messages to identify information associated with nodes in MANET 100. The identified information may comprise, for example, a list of interface addresses advertised by each node. A node may have at least one main address, and may have multiple interfaces participating in MANET 100. Network node 120 may store a data repository tracking a one-to-many relationship of nodes with multiple interfaces. The identified information may also comprise information about actual links to one hop and two hop neighbors. In MANET 100, for example, network nodes 110, 130, and 140 are one hop neighbors of network node 120 and network node 150 is a two hop neighbor. Network node 120 may also receive control messages from nodes beyond two-hops, such as network node 160, allowing network node 120 to build a list of nodes present in MANET 100.

From stage 210, where computing device 400 analyzed the network environment, method 200 may advance to stage 220 where computing device 400 may create a routing table. For example, network node 120 may use the information identified from the network analysis in stage 210 to create the routing table. The routing table may comprise information identifying the hop distance and the next node to send data packets to for delivery to other nodes in MANET 100. In MANET 100, network node 120 may create a routing table entry for network node 160 identifying the hop distance as 3 and the next node as network node 140. Thus, when network node 120 needs to send data addressed to network node 160, which may comprise data generated by network node 120 and/or data received from another network node such as network node 110, the routing table entry may cause the data to be sent to network node 140. Network node 140 may have a routing table entry identifying network node 150 as the next node and may forward the data in turn.

Once computing device 400 creates the routing table in stage 220, method 200 may continue to stage 230 where computing device 400 may update the routing table. For example, network node 120 may comprise a mobile device that moves out of range of network node 130. In response to this movement, network node 120 may update the routing table to indicate that network node 130 is now two hops away and the next node to which to send data addressed to network node 130 is network node 110. Consistent with embodiments of the invention, network nodes in MANET 100 may transmit and receive periodic control messages comprising routing updates and the network nodes may use these control messages to update their respective routing tables.

After computing device 400 updates the routing table in stage 230, method 200 may proceed to stage 240 where computing device 400 may determine whether any disruption has occurred. For example, an entry associated with network node 140 in the routing table for network node 130 may comprise an expiration time. If no control messages associated with network node 140 are received before the routing table entry expires, network node 140 may determine that a disruption has occurred. This may be caused, for example, by network node 140 moving out of range of network node 120 and any other network nodes that network node 120 may reach either directly or by forwarding data to neighboring nodes. If no disruption is detected, method 200 may return to stage 230 where computing device 400 may continue to update the routing table.

If computing device 400 detects a network disruption in stage 240, method 200 may advance to stage 250, where computing device 400 may designate one of the remaining connected nodes as a cache node for the disrupted node. For example, when connection 170 is disrupted between network node 120 and network node 140, network node 120 may be designated as a cache node for network node 140. Consistent with embodiments of the invention, designating network node 120 as a cache node may comprise updating the routing table of network node 120 to add an imaginary route to network node 140 with network node 120 as the destination node. This routing table update may be propagated to network node 110 and network node 130 via a routing table update control message. Network node 140 may be similarly designated as a cache node for network node 120 and it neighbors, network node 110 and network node 130. In this way, the nodes on either side of the disrupted network connection may act as a proxy store-carry-forward cache for the duration of the disruption. Further consistent with embodiments of the invention, network node 120, for example, may perform a recursive topology dependency check to ensure that the full depth of the disruption may be realized and compensated for.

The cache node may generate control messages, flagged as imaginary, indicating that the cache node may be willing to act as a cache node for a node and/or nodes affected by the network disruption. For example, in an OLSR protocol network, control messages may be used to propagate routing information. Consistent with embodiments of the invention, a field of the control message may be used to indicate that the update contains an imaginary destination address, signifying a disrupted connection. The reserved field may indicate the closeness of the imaginary, disrupted node measured in hop counts, thus allowing the designation of a cache node closest to the disrupted node prior to the disruption.

Once computing device 400 designates a cache node in stage 250, method 200 may advance to stage 260 where computing device 400 may route packets for a disrupted node to the cache node. For example, network node 130 may generate a data packet destined for network node 140. Pursuant to the imaginary route propagated in stage 250, network node 130 may send the data packet to network node 120, which may be serving as the cache node. Network node 120 may store the data packet for a period of time and/or indefinitely in a memory cache. Consistent with embodiments of the invention, short term and long term caching may be supported by implementing both a packet and a bundle cache mechanism. Packet caching may be aimed at short disruptions, up to a minute, for example, and may allow standard synchronous network applications to operate across an intermittently connected network without any modification. The packet caching mechanism may be implemented as a finite First-In-First-Out (FIFO) buffer and may further include a TCP Performance Enhanced Proxy (PEP).

If the length of the network disruption is high, then packet based caching may cause the cached information to be discarded as the cache overflows, becomes stale (e.g. the information has been stored for longer than a predetermined time interval), or causes application senders and receivers to timeout. The message based cache may comprise a disruption mechanism based on the exchange of bundles of packets. Bundles may be assembled by an application and passed to a bundle protocol for processing. The mechanism may implement a convergence layer adaptor that works with a higher layer bundle protocol to enable the caching of bundles across an Internet Protocol (IP) based network. For example, the Internet Assigned Numbers Authority (IANA) has allocated port 4556 for TCP/UDP transport of bundles over IP. Network nodes in MANET 100 may assume that IP packets arriving on this port destined for a disrupted node may be passed up to the bundle mechanism for processing.

From stage 260, where computing device 400 routed packets destined for a disrupted node to the cache node, method 200 may advance to stage 270 where computing device 400 may determine whether the network disruption has ended. For example, network node 120 may receive a data packet from one of the disrupted nodes, such as network node 140. The data packet may comprise, for example, a control message, a routing table update, and/or an application data packet.

If the disruption is continuing, method 200 may return to stage 260 where computing device 400 may continue to route packets to the cache node. If, at stage 270, computing device 400 determines that the disruption has ended, method 200 may advance to stage 280 where computing device 400 may deliver the cached data to the formerly disrupted node. For example, network node 120 may deliver cached data packets to network node 140 once connection 170 is re-established. Network node 120 may also forward data packets cached for network node 150 and network node 160 to network node 140 for further routing. Consistent with embodiments of the invention, the imaginary route causing network packets to be delivered to the cache node may be removed from the routing table. An routing entry causing network packets to be delivered directly to the formerly disrupted node may be inserted and/or updated in the routing table. After the cached packets have been delivered to the formerly disrupted node in stage 280, method 200 may then end at stage 285.

FIGS. 3A-3D are block diagrams of a use case implementing a hybrid routing protocol. A mobility model 300 comprises four network nodes, 110, 120, 130, and 140. Multi-hop network segments experience formation, disruption, and reconnection throughout four different topologies.

Figure 3A:
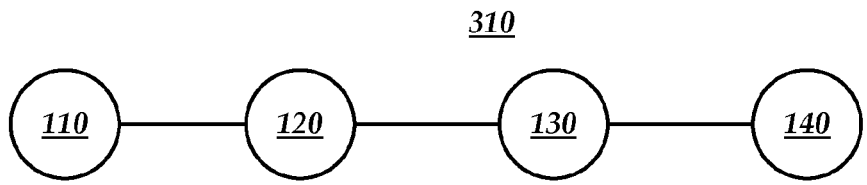
FIG. 3 is a block diagram of a use case implementing a hybrid routing protocol.

FIG. 3A comprises an initial topology state 310, each node may discover and build a list of connections and neighboring nodes. In state 310, node 110 has a single connection to a single neighboring node 120 and node 120 has a connection to each of two neighbors, nodes 110 and 130. Node 130 similarly has a connection to each of two neighbors, nodes 120 and 140, and node 140 has a single connection to neighboring node 130. In state 310, node 110 may route data to nodes 130 and 140 by sending the data to its neighboring node 120.

Figure 3B:
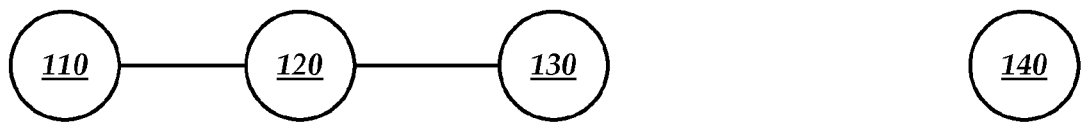

FIG. 3B comprises a second topology state 320. In state 320, node 140 moves out of range of node 130, and a neighbor loss event may occur. This event may comprise a control message that may cause nodes 110, 120, and 130 to remove node 140 from their respective routing tables. Node 130, as the closest neighboring node to the disrupted node 140, may be designated as a cache node for node 140 while node 140 may designate itself as a cache node for node 130. Node 140 may be further designated as a cache node for nodes 110 and 120 due to the dependence of node 140 on routing packets destined to nodes 110 and 120 through node 130.

Node 130 may generate control messages to nodes 110 and 120 in order to propagate an imaginary routing entry for disrupted node 140. This may keep a route to node 140 alive to nodes in the network until such time as the disruption ends, such as by node 140 reconnecting either to node 130 or another connection point in the network. All data packets addressed to node 140 may thus be routed to cache node 130 for storing in memory.

Figure 3C:

FIG. 3C comprises a third topology state 330. In state 330, a disruption may exist between nodes 120 and 130. Nodes 120 and 130 may be designated as cache nodes for each other and their dependent nodes. For example, node 120 may receive data destined for node 130 from node 110 while node 130 may receive data destined for node 110 from node 140. Furthermore, node 130 may re-establish connection with node 140 via a link-sensing mechanism such as receipt of control messages from node 140. As the link between nodes 130 and 140 is re-established, each node may expunge the data cached and waiting to be delivered to the other. Consistent with embodiments of the invention, node 140 may deliver cached data packets destined for nodes 110 and 120 to node 130 as node 130 is now designated as the cache node for those nodes on the other side of the disrupted link. This designation may occur due to the prior closeness of node 130 to nodes 110 and 120. For example, the hop count from node 130 to node 110 during the last non-disrupted state (topology state 310) was less than the hop count from node 140 to node 110 during the last non-disrupted state. This closeness may provide a basis for designating node 130 as the new cache node for packets to be delivered from node 140.

Figure 3D:
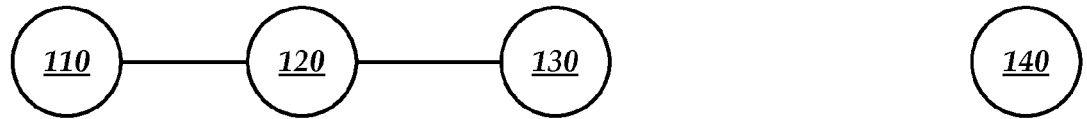

FIG. 3D comprises a fourth topology state 340. In state 340, node 130 has once again moved out of range of node 140 and re-connected with node 120. Node 130 may now deliver the cached data packets destined for nodes 110 and 120. Node 130 may receive packets destined both for itself and for node 140 from node 120, which had been serving as the cache node for nodes 130 and 140. As above, node 130 may cache the packets for node 140 until the disruption with node 140 ends. Consistent with embodiments of the invention, nodes 120 and 140 may remain out of range of simultaneous communication while node 130 shuttles back and forth between them. In this way, node 130 may maintain a semblance of synchronous communication between two disrupted network nodes.

An embodiment consistent with the invention may comprise a system for providing a hybrid routing protocol. The system may comprise a memory storage and a processing unit coupled to the memory storage. The processing unit may be operative to analyze a network comprising a plurality of nodes, detect a disruption between nodes of the network, and activate a disruption tolerance mechanism in response to the network disruption.

Another embodiment consistent with the invention may comprise a system for providing a hybrid routing protocol. The system may comprise a memory storage and a processing unit coupled to the memory storage. The processing unit may be operative to create a routing table comprising a list of network nodes, periodically update the routing table, detect a disruption in a network connection among the network nodes, and update a routing table entry associated with the disrupted node to cause network data addressed to the disrupted node to be routed to at least one cache node.

Yet another embodiment consistent with the invention may comprise a system for providing a hybrid routing protocol. The system may comprise a memory storage and a processing unit coupled to the memory storage. The processing unit may be operative to analyze an ad-hoc network and develop a routing table comprising a list of nodes and their connections in the ad-hoc network, update the routing table on a periodic basis, route network traffic among the plurality of nodes in the ad-hoc network according to the routing table, detect a disruption in the network, designate a cache node among the nodes for a disrupted node, insert an imaginary routing entry in the routing table for the disrupted node, wherein the imaginary routing entry causes network data destined for the disrupted node to be routed to the cache node, detect a return of the disrupted node, and deliver network data stored by the cache node to the disrupted node.

Figure 4:
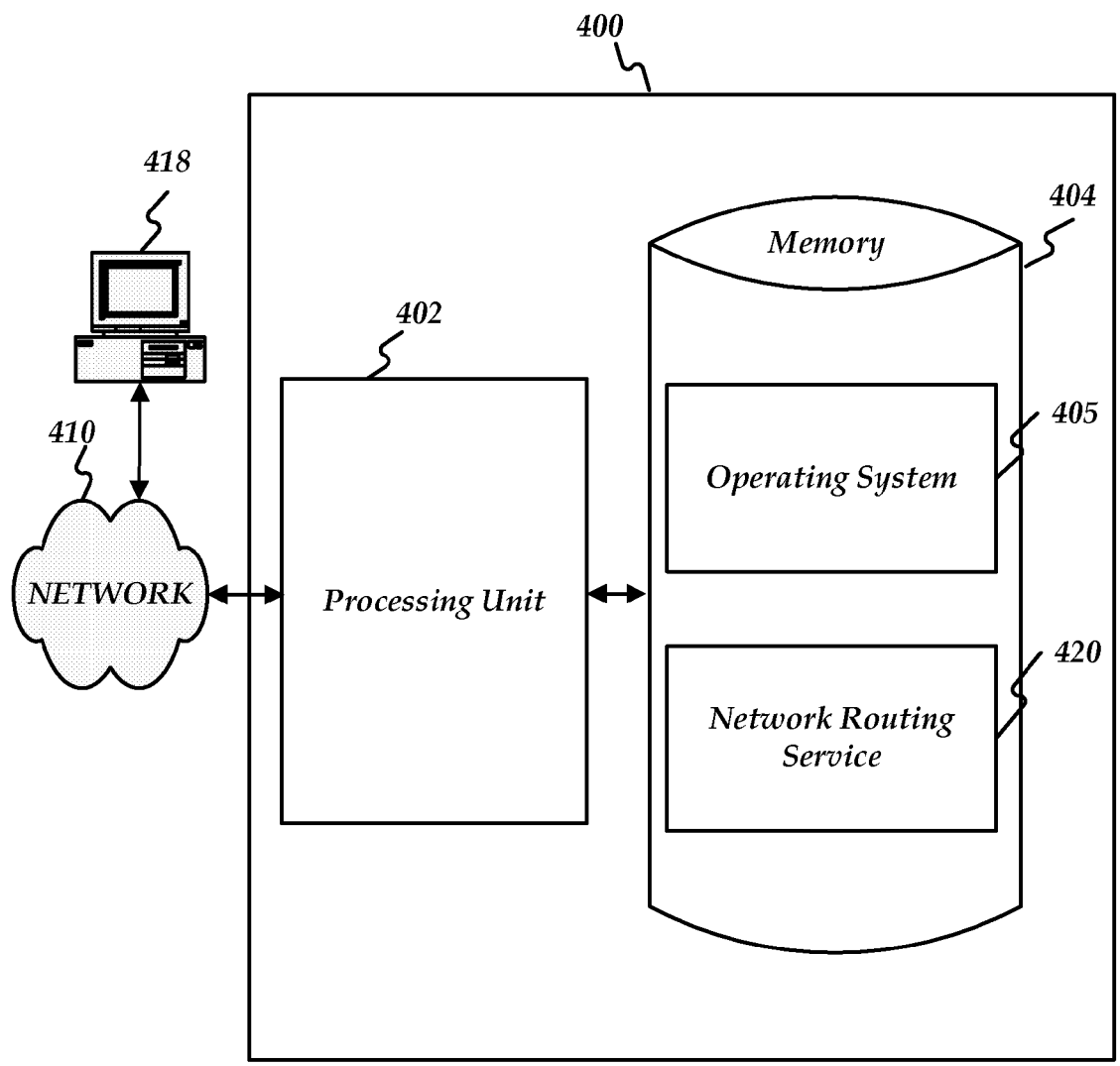
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise an operating environment for system 100 as described above. System 100 may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, and one or more programming modules such as a network routing service 407. Operating system 405, for example, may be suitable for controlling computing device 400's operation. In one embodiment, the programming modules may include programs that communicate via a network 410. Furthermore, embodiments of the invention may be practiced in conjunction with a graphics library, other operating systems, or any other application program and is not limited to any particular application or system.

Computing device 400 may have additional features or functionality. For example, computing device 400 may also include additional data storage devices (removable and/or non-removable) such as, for example, magnetic disks, optical disks, or tape. Computer storage media may include volatile and nonvolatile, removable and non-removable media implemented in any method or technology for storage of information, such as computer readable instructions, data structures, program modules, or other data. System memory 404, the removable storage, and the non-removable storage are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) such as a keyboard, a mouse, a pen, a sound input device, a touch input device, etc. Output device(s) such as a display, speakers, a printer, etc. may also be included. The aforementioned devices are examples and others may be used.

Computing device 400 may also contain a communication connection that may allow device 400 to communicate with other computing devices 418, such as over network 410 in a distributed computing environment, for example, an intranet or the Internet. The communication connection is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules (e.g. messaging application 408) may perform processes including, for example, one or more method 200's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing a hybrid routing protocol, the method comprising:
    analyzing, by a routing device, a network comprising a plurality of network nodes;
    detecting, by the routing device, a disruption between at least one first network node and at least one second network node; and
    activating, by the routing device, a disruption tolerance mechanism in response to detecting the disruption in the network, wherein activating the disruption tolerance mechanism comprises:
        designating a cache node among the plurality of network nodes, wherein the cache node is operative for storing network traffic designated for the at least one first network node for at least a predetermined time interval; and
        inserting an imaginary routing entry into a routing table for the at least one second network node causing network traffic designated for the at least one first network node to be routed to the cache node; and
        detecting an end of the disruption between the at least one first network node and the at least one second network node during the predetermined time interval; and
        delivering the stored network traffic to the at least one first network node.

2. The method of claim 1, wherein analyzing the network comprises developing the routing table for the network; and periodically updating the routing table for the network.

3. The method of claim 1, wherein the network comprises an ad-hoc wireless network using a synchronous routing protocol.

4. The method of claim 1, wherein the disruption results from the at least one first network node moving out of transmission range of the at least one second network node.

5. The method of claim 1, wherein detecting the end of the disruption comprises receiving at least one data packet from the at least one first network node by the cache node.

6. The method of claim 1, further comprising: in response to detecting the end of the disruption between the at least one first network node and the at least one second network node, removing the routing entry causing network traffic designated for the at least one first network node to be routed to the cache node.

7. The method of claim 6, further comprising designating the cache node for the at least one first network node as the cache node for the at least one third network node.

8. The method of claim 1, wherein the at least one first node comprises a routing link between the at least one second node and at least one third node and further comprising designating the at least one first node as a second cache node for the at least one third node.

9. A non-transitory computer-readable medium which stores a set of instructions which when executed performs a method for providing a hybrid routing protocol, the method executed by the set of instructions comprising:
    creating a routing table comprising a list of a plurality of network nodes;
    periodically updating the routing table;
    detecting a disruption in a network connection to at least one first network node;
    updating a routing table entry associated with the at least one first network node to cause network data addressed to the at least one first network node to be routed to at least one cache node, wherein updating the routing table entry comprises inserting an imaginary routing entry in the routing table and wherein the at least one cache node is operative to store at least one packet destined for the at least one first network node;
    detecting a reconnection to the at least one first network node;
    delivering the at least one packet destined for the at least one first network node from the at least one cache node to the at least one first network node; and
    redirecting network data routed to the at least one cache node from the at least one cache node to the at least one first network node.

10. The non-transitory computer-readable medium of claim 9, wherein detecting the reconnection to the at least one first network node comprises receiving a data packet transmitted by the at least one first network node.

11. The non-transitory computer-readable medium of claim 10, further comprising:
    determining the number of connection hops between at least two of the plurality of network nodes and the at least one first network node; and
    designating the network node of the at least two network nodes having the fewest number of connection hops to the at least one first network node as the at least one cache node.

12. The non-transitory computer-readable medium of claim 9, wherein detecting the reconnection to the at least one first network node comprises receiving a routing table update from the at least one first network node.

13. The non-transitory computer-readable medium of claim 9, wherein creating the routing table comprises determining a number of connection hops between at least two of the network nodes of the plurality of network nodes.

14. The non-transitory computer-readable medium of claim 9, wherein detecting the disruption in the network connection to at least one first network node comprises detecting an expiration of an entry in the routing table associated with the at least one first network node.

15. The non-transitory computer-readable medium of claim 9, further comprising updating a routing table entry associated with at least one second network node in response to detecting the disruption in a network connection to at least one first network node, wherein routing network data to the at least one second network node comprises routing network data through the at least one first network node and wherein updating the routing table entry comprises redirecting network data from the at least one second network node to the at least one cache node.

16. A system for providing a hybrid routing protocol, the system comprising:
    a memory storage; and
    a processing unit coupled to the memory storage, wherein the processing unit is operative to:
        analyze an ad-hoc network environment, wherein being operative to analyze the ad-hoc network comprises being operative to develop a routing table comprising a list of a plurality of nodes in the ad-hoc network environment and a list of network connections among the plurality of nodes;
        update the routing table on a periodic basis;
        route network traffic among the plurality of nodes in the ad-hoc network environment according to the routing table;
        detect a disruption in the network, wherein being operative to detect the disruption in the network comprises being operative to determine that at least one first node of the plurality of nodes cannot route network data to at least one second node of the plurality of nodes;

designate a cache node among the plurality of nodes, wherein the cache node is operative to receive and store network data associated with the at least one second node;

insert an imaginary routing entry in the routing table for the at least one second node of the plurality of nodes, wherein the imaginary routing entry causes network data destined for the at least one second node to be routed to the cache node and wherein network data destined for the at least one node and routed to the cache node comprises at least one indicator that the network data is to be stored by the cache node;

detect a return of the at least one second node, wherein being operative to detect the return of the at least one second node comprises being operative to detect receipt of at least one transmission from the at least one second node by at least one of the following: the at least one first node and the cache node; and deliver network data stored by the cache node to the at least one second node.

* * * * *